United States Patent
Ballani et al.

(10) Patent No.: US 9,519,500 B2
(45) Date of Patent: *Dec. 13, 2016

(54) OFFERING NETWORK PERFORMANCE GUARANTEES IN MULTI-TENANT DATACENTERS

(71) Applicant: Microsoft Corporation, Redmond, WA (US)

(72) Inventors: Hitesh Ballani, Cambridge (GB); Paolo Costa, Cambridge (GB); Thomas Karagiannis, Cambridge (GB); Antony Rowstron, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

This patent is subject to a terminal disclaimer.

(21) Appl. No.: 14/177,202

(22) Filed: Feb. 10, 2014

(65) Prior Publication Data

US 2014/0157274 A1   Jun. 5, 2014

Related U.S. Application Data

(63) Continuation of application No. 13/176,901, filed on Jul. 6, 2011, now Pat. No. 8,671,407.

(51) Int. Cl.
*G06F 9/455* (2006.01)
*G06F 9/50* (2006.01)
(Continued)

(52) U.S. Cl.
CPC ....... *G06F 9/45533* (2013.01); *G06F 9/45558* (2013.01); *G06F 9/5077* (2013.01);
(Continued)

(58) Field of Classification Search
None
See application file for complete search history.

(56) References Cited

U.S. PATENT DOCUMENTS 7,900,206 B1 * 3/2011 Joshi ............... G06F 9/505
　　　　　　　　　　　　　　　　　　 709/223
8,019,766 B2 * 9/2011 Chan ............ G06F 17/30867
　　　　　　　　　　　　　　　　　　 707/740

(Continued)

OTHER PUBLICATIONS

Al-Fares, et al., "A Scalable, Commodity Data Center Network Architecture", retrieved on Apr. 5, 2011 at <<http://ccr.sigcomm.org/online/files/p63-alfares.pdf>>, ACM SIGCOMM, Seattle, Washington, Aug. 17, 2008, pp. 63-74.

(Continued)

*Primary Examiner* — Emerson Puente
*Assistant Examiner* — Mehran Kamran
(74) *Attorney, Agent, or Firm* — Tom Wong; Micky Minhas; Zete Law, P.L.L.C.

(57) ABSTRACT

Methods of offering network performance guarantees in multi-tenant datacenters are described. In an embodiment, a request for resources received at a datacenter from a tenant comprises a number of virtual machines and a performance requirement, such as a bandwidth requirement, specified by the tenant. A network manager within the datacenter maps the request onto the datacenter topology and allocates virtual machines within the datacenter based on the available slots for virtual machines within the topology and such that the performance requirement is satisfied. Following allocation, stored residual capacity values for elements within the topology are updated according to the new allocation and this updated stored data is used in mapping subsequent requests onto the datacenter. The allocated virtual machines form part of a virtual network within the datacenter which is allocated in response to the request and two virtual network abstractions are described: virtual clusters and virtual oversubscribed clusters.

20 Claims, 9 Drawing Sheets

(51) Int. Cl.
  *H04L 29/08* (2006.01)
  *H04L 29/06* (2006.01)
(52) U.S. Cl.
  CPC ............ *H04L 67/101* (2013.01); *H04L 67/38* (2013.01); *G06F 2009/45579* (2013.01); *G06F 2209/501* (2013.01)

(56) References Cited

U.S. PATENT DOCUMENTS

| | | | |
|---|---|---|---|
| 8,370,496 B1* | 2/2013 | Marr | H04L 67/1031 370/396 |
| 8,671,407 B2* | 3/2014 | Ballani | H04L 67/101 718/1 |
| 2007/0260723 A1* | 11/2007 | Cohen | G06F 9/5027 709/223 |
| 2008/0155537 A1* | 6/2008 | Dinda | G06F 9/4887 718/1 |
| 2008/0256607 A1 | 10/2008 | Janedittakarn et al. | |
| 2010/0205302 A1 | 8/2010 | Rechterman | |
| 2010/0257263 A1 | 10/2010 | Casado et al. | |
| 2010/0281478 A1* | 11/2010 | Sauls | G06F 9/5077 718/1 |
| 2011/0035494 A1* | 2/2011 | Pandey | G06F 9/5077 709/224 |
| 2011/0099267 A1* | 4/2011 | Suri | G06F 9/4856 709/224 |
| 2011/0119381 A1* | 5/2011 | Glover | G06F 9/5072 709/226 |
| 2011/0252135 A1* | 10/2011 | Kudo | G06F 9/5044 709/224 |
| 2011/0296052 A1* | 12/2011 | Guo | H04L 45/34 709/240 |
| 2012/0054763 A1* | 3/2012 | Srinivasan | G06F 9/5005 718/104 |
| 2012/0102190 A1* | 4/2012 | Durham | H04L 41/0823 709/224 |
| 2012/0159476 A1* | 6/2012 | Ramteke | G06F 9/5033 718/1 |
| 2012/0179446 A1* | 7/2012 | Tylutki | G06F 11/3442 703/21 |
| 2012/0233333 A1* | 9/2012 | Ganesan | H04L 41/5051 709/227 |
| 2012/0284408 A1* | 11/2012 | Dutta | G06F 9/5066 709/226 |
| 2012/0331124 A1* | 12/2012 | Venkatesh | G06F 9/50 709/224 |
| 2013/0007272 A1* | 1/2013 | Breitgand | G06Q 10/06 709/224 |

OTHER PUBLICATIONS

Al-Fares, et. al., "Hedera: Dynamic Flow Scheduling for Data Center Networks", retrieved on Apr. 5, 2011 at <<http://www.usenix.org/event/nsdi10/tech/full_papers/al-fares.pdf>>, USENIX Symposium on Networked Systems Design and Implementation (NSDI), San Jose, CA, Apr. 28, 2010, pp. 1-15.

"Amazon EC2 Spot Instances", retrieved on Apr. 5, 2011 at <<http://aws.amazon.com/ec2/spot-instances/>>, Amazon, AWS Blog, 2010, pp. 1-3.

Ananthanarayanan, et al., "Reining in the Outliers in Map-Reduce Clusters using Mantri", retrieved on Apr. 5, 2011 at <<http://www.usenix.org/event/osdi10/tech/full_papers/Ananthanarayanan.pdf>>, ACM, Proceedings of USENIX Conference on Operating Systems Design and Implementation (OSOi), 2010, pp. 1-14.

Armbrust, et al., "Above the Clouds: A Berkeley View of Cloud Computing", retrieved on Apr. 5, 2011 at <<http://www.eecs.berkeley.edu/Pubs/TechRpts/2009/EECS-2009-28.pdf>>, University of California at Berkeley, Technical Report UCB/EECS-2009-28, Feb. 10, 2009, pp. 1-25.

Ballani, et al., "Towards Predictable Datacenter Networks", retrieved on Oct. 12, 2011 at <<http://research.microsoft.com/apps/pubs/default.aspx?id=149601>>, Microsoft Corporation, Microsoft Research, Technical Report MSR-TR-2011-72, May 2011, pp. 1-17.

Bavier, et al., "In VINI Veritas: Realistic and Controlled Network Experimentation", retrieved on Apr. 5, 2011 at <<http://www.cs.princeton.edu/-jrex/papers/vini.pdf>>, ACM SIGCOMM, Proceedings of Conference on Applications, Technologies, Architectures, and Protocols for Computer Communications, Pisa, Italy, Sep. 11, 2006, pp. 3-14.

Bias, "Amazon's EC2 Generating 220M+ Annually", retrieved on Apr. 5, 2011 at <<http://cloudscaling.com/blog/cloud-computing/amazons-ec2-generating-220m-annually>>, Cloudscaling, Oct. 1, 2009, pp. 1-27.

Black, et al., "Ethernet Topology Discovery without Network Assistance", retrieved on Apr. 5, 2011 at <<http://www.ieee-icnp.org/2004/papers/9-1.pdf>>, IEEE Computer Society, Intl Conference on Network Protocols (ICNP), 2004, pp. 328-339.

Casado, et al., "Virtualizing the Network Forwarding Plane", retrieved on Apr. 5, 2011 at <<http://www.google.co.in/url?sa =t&sou rce=web&cd = 1 & ved=OCBwQ FjAA&u rl =http%3A %2 F%2F yu ba .stanford. ed u %2 F-casado%2 F virt-presto.pdf&ei=ivKbTeOuHMW7hAeGilnKBg &usg=AFQjCNEuWxYla8gLZWsWVT JOIqSzB2fPWw>>, ACM, Proceedings of Workshop on Programmable Routers for Extensible Services of Tomorrow (PRESTO), Philadelphia, PA, vol. 8, Nov. 2010, pp. 1-6.

Chaiken, et al., "SCOPE: Easy and Efficient Parallel Processing of Massive Data Sets", retrieved on Apr. 5, 2011 at <<http://www.goland.org/Scope-VLDB-final.pdf>>, VLDB Endowment, Journal of Proceedings of VLDB Endowment, Auckland, New Zealand, vol. 1, No. 2, Aug. 2008, pp. 1265-1276.

Chowdhury, "Resource Management in Multi-Clusters: Cloud Provisioning", retrieved on Apr. 5, 2011 at <<http://www.mosharaf.com/wp-content/uploads/mosharaf-cpp-report-spring 1O .pdf>>, Apr. 30, 2010 pp. 1-12.

Claybrook, "Comparing cloud risks and virtualization risks for data center apps", retrieved on Apr. 4, 2011 at <<http://searchdatacenter.techtarget. com/tip/Comparing-cloud-risks-and-virtual ization-risks-for-data-center-apps> >, Tech Target networks, first published Feb. 2010, pp. 1-11.

"Crossbow: Network Virtualization and Resource Control", retrieved on Apr. 5, 2011 at <<http://hub.opensolaris.org/bin/view/Project+crossbow/WebHome>>, opensolaris, Oct. 26, 2009, pp. 1-2. (presented at OSCON, San Jose, California, Jul. 20, 2009).

Dean, et al., "MapReduce: Simplified Data Processing on Large Clusters", retrieved on Apr. 5, 2011 at <<http://labs.google.com/papers/mapreduce-osdi04.pdf>>, Proceedings of Conference Symposium on Operating Systems Design and Implementation (OSOi), vol. 6, 2004, pp. 1-13.

Duffield, et al., "A Flexible Model for Resource Management in Virtual Private Networks", retrieved on Apr. 5, 2011 at <<http://conferences.sigcomm.org/sigcomm/1999/papers/session3-2.pdf>>, ACM SIGCOMM, Proceedings of the Conference on Applications, Technologies, Architectures, and Protocols for Computer Communication, 1999, pp. 95-108.

Giurgiu, "Network performance in virtual infrastructures: A closer look at Amazon EC2", retrieved on Apr. 5, 2011 at <<http:l/staff.science.uva.nl/-delaat/sne-2009-201 O/p29/presentation.pdf>>, Universiteit Van Amsterdam, research presentation, Feb. 3, 2010, pp. 1-18.

Greenberg, et al., "VL2: A Scalable and Flexible Data Center Network", retrieved on Apr. 5, 2011 at <<http://citeseerx.ist.psu.edu/viewdoc/download?doi=10.1.1.156.6990&rep=rep1 &type=pdf>>, ACM SIGCOMM, Conference on Data Communication, Barcelona, Spain, Aug. 17, 2009, pp. 51-62.

Guo, et. al, "Second Net: A Data Center Network Virtualization Architecture with Bandwidth Guarantees", retrieved on Apr. 5, 2011 at <<http://research.microsoft.com/pubs/132644/tr81.pdf>>, ACM, Proceedings of Intl Conference on Emerging Networking Experiments and Technologies (CoNEXT), Philadelphia, PA, Article 15, Nov. 30, 2010, pp. 1-14.

(56) References Cited

OTHER PUBLICATIONS

Hajjat, et al., "Cloudward Bound: Planning for Beneficial Migration of Enterprise Applications to the Cloud", retrieved on Apr. 5, 2011 at <<http://cobweb.ecn.purdue.edu/-isl/sigcomm10-planning.pdf>>, ACM SIGCOMM, New Delhi, India, Aug. 30, 2010, pp. 243-254.

He, et al., "Case Study for Running HPC Applications in Public Clouds", retrieved on Apr. 5, 2011 at <<http://dsl.cs.uchicago.edu/ScienceCloud201 O/p04.pdf>>, ACM, Proceedings of Intl Symposium on High Performance Distributed Computing (HPDC), Chicago, Illinois, Jun. 20, 2010, pp. 395-401.

Hickey, "Amazon Cloud Goes Single Tenant With Dedicated Instances", retrieved on Apr. 5, 2011 at <<http://www.crn.com/news/cloud/229400402/amazon-cloud-goes-single-tenant-with-dedicated-instances.htm>>, CRN.com, Mar. 28, 2011, pp. 1-2.

"High Performance Computing (HPC)", retrieved on Oct. 12, 2011 at <<http://aws.amazon.com/hpc-applications/>>, Amazon, AWS at Supercomputing, 2011, pp. 1-4.

Houidi, et al., "A Distributed Virtual Network Mapping Algorithm", retrieved on Apr. 5, 2011 at <<http://ieeexplore.ieee.org/stamp/stamp.jsp?tp=&arnumber=4534092, IEEE Intl Conference on Communications (ICC), Beijing, China, May 19, 2008, pp. 5634-5640.

Iosup, et al., "On the Performance Variability of Production Cloud Services", retrieved on Apr. 5, 2011 at <<http://pds.twi.tudelft.nl/reports/201O/PDS-2010-002.pdf>>, Delft University of Technology, Parallel and Distributed Systems Report Series, Technical Report PDS-2010-002, Jan. 2010, pp. 1-22.

Isard, et al., "Dryad: Distributed Data-Parallel Programs from Sequential Building Blocks", retrieved on Apr. 5, 2011 at <<http://citeseerx.ist.psu.edu/viewdoc/download;jsessionid=55CE5F68A401258751692644411 D7DA5?doi=10.1.1.70.3539&rep=rep1 &type=pdf, ACM, Proceedings of European Conference on Computer Systems (EuroSys), Lisboa, Portugal, Mar. 21, 2007, pp. 59-72.

Kandula, et al., "Flyways to De-Congest Data Center Networks", retrieved on Apr. 5, 2011 at <<http://conferences.sigcomm.org/hotnets/2009/papers/hotnets2009-final112.pdf>>, Proceedings of HotNets, San Francisco, California, Dec. 2005, pp. 1-6.

Kandula, et al., "The Nature of Datacenter Traffic: Measurements and Analysis", retrieved on Apr. 5, 2011 at <<http://citeseerx.ist.psu.edu/viewdoc/download?doi=10.1.1.159.4689&rep=rep1 &type=pdf>>, ACM SIGCOMM, Proceedings of Conference on Internet Measurement (I MC), Chicago, Illinois, Nov. 4, 2009, pp. 1-7.

Kossman, et al., "An Evaluation of Alternative Architectures for Transaction Processing in the Cloud", retrieved on Apr. 5, 2011 at <<http://citeseerx. ist. psu .edu/viewdoc/download ;jsessionid=69A 14F5BD4C42DC2C4E2DDD37147EA99? doi=10.1.1.169.2041 &rep=rep1 &type=pdf>>, ACM SIGMOD, Proceedings of Conference on Management of Data, Indianapolis, Indiana, Jun. 6, 2010, pp. 579-590.

Lam, et al., "NetShare: Virtualizing Data Center Networks across Services", retrieved on Apr. 5, 2011 at <<http://www. google.co.uk/url?sa=t&source=web&cd=4&ved=OCC4QFjAD &url=http%3A%2F%2Fcsetechrep.ucsd.edu%2FDienst%2FRepository%2F2.0%2FBody%2Fncstrl.ucsd_cse%2FCS2010-0957%2Fpostscript &ei=Zd2aTeHZB8mYhQfAi5HYBg &usg=AFQjCNE9VLpOksvf3k2xP7nxvO-bQeKpgw>>, University of California at San Deigo, Technical Report CS2010-0957, May 2010, pp. 1-13.

Li, et al., "CloudCmp: Comparing Public Cloud Providers", retrieved on Apr. 5, 2011 at <<http://research.microsoft.com/pubs/136448/cloudcmp-imc201 O.pdf>>, ACM, Proceedings of USENIX Conference on Internet Measurement (IMC), Melbourne, Australia, Nov. 1, 2010, pp. 1-14.

Mangat, "EC2 Variability: The numbers revealed, Measuring EC2 system performance", retrieved on Apr. 4, 2011 at <<http://tech.mangot.com/roller/dave/entry/ec2_variability_the_numbers_revealed>>, urandom Mangat ideas, May 13, 2009, pp. 1-5.

Meng, et al., "Improving the Scalability of Data Center Networks with Traffic-aware Virtual Machine Placement", retrieved onn Apr. 5, 2011 at <<http://www.cmlab.csie.ntu.edu.tw/-jimmychad/CN2011/Readings/Improving.pdf>>, IEEE Press, Proceedings of Conference on Information Communications (INFOCOM), 2010, pp. 1154-1162.

Mudigonda, et al., "SPAIN: COTS Data-Center Ethernet for Multipathing over Arbitrary Topologies", retrieved on Apr. 5, 2011 at <<http://www.usenix.org/evenUnsdi10/tech/full_papers/mudigonda.pdf>>, USENIX Symposium on Networked Systems Design and Implementation (NSDI), San Jose, CA, Apr. 28, 2010, pp. 1-15.

Planky, "Cloud Virtual Networks: PaaS and laaS approaches", retrieved on Apr. 5, 2011 at <<http://blogs.msdn.com/b/ukmsdn/archive/2011 /03/17 /cloud-virtual-networks-paas-and-iaas-approaches.aspx>>, Microsoft Corporation, MSDN UK Team Blog, Mar. 17, 2011, pp. 1-2.

Raghavan, et al., "Cloud Control with Distributed Rate Limiting", retrieved on Apr. 5, 2011 at <<http://citeseerx.ist.psu.edu/viewdoc/download?doi=10.1.1.78.6517&rep=rep1 &type=pdf, ACM SIGCOMM, Kyoto, Japan, Aug. 27, 2007, pp. 1-12.

Ricci, et al., "A Solver for the Network Testbed Mapping Problem", retrieved on Apr. 5, 2011 at <<http://www.cs.utah.edu/flux/papers/assign-ccr03.pdf>>, ACM SIGCOMM Computer Communication Review, vol. 33, No. 2, Apr. 2003, pp. 65-81.

Schad, et al., "Runtime Measurements in the Cloud: Observing, Analyzing, and Reducing Variance", retrieved on Apr. 5, 2011 at <<http://citeseerx.ist.psu.edu/viewdoc/download?doi=10.1.1.174.5672&rep=rep1 &type=pdf>>, Proceedings of the VLDB Endowment, Singapore, vol. 3, No. 1, Sep. 13, 2010, pp. 460-471.

Shieh, et al., "Sharing the Data Center Network", retrieved on Apr. 5, 2011 at <<http://www.usenix.org/events/nsdi11/tech/full_papers/Shieh.pdf>>, ACM, Proceedings of USENIX Conference on Networked Systems Design and Implementation (NSDI), 2011, pp. 23-23.

Soares, et al., "Gatekeeper: Distributed Rate Control for Virtualized Datacenters", retrieved on Oct. 12, 2011 at <<http://www.hpl.hp.com/techreports/201O/HPL-2010-151.html>>, Hewlett-Packard Development Company, HP Laboratories, Technical Report HP-2010-151, Oct. 2010, pp. 1-10.

"Traffic Control API", retrieved on Apr. 5, 2011 at <<http://msdn.microsoft.com/en-us/library/aa374468%28v=VS.85%29.aspx>>, Microsoft Corporation, Jan. 2011, pp. 1.

Walker, "benchmarking Amazon EC2 for high-performance scientific computing", retrieved on Apr. 5, 2011 at <<http://www.usenix.org/publications/login/2008-10/openpdfs/walker.pdf>>, IEEE LOGIN, vol. 33, No. 5, 2008, pp. 18-23.

Wang, et al., "c-Through: Part-time Optics in Data Centers", retrieved on Apr. 5, 2011 at <<http://www.cs.rice.edu/ -gw4314/papers/cthrough-sigcomm10.pdf>>, ACM, SIGCOMM, New Delhi, India, Aug. 30, 2010, pp. 327-338.

Wang, et al., "Distributed Systems Meet Economics: Pricing in the Cloud", retrieved on Apr. 5, 2011 at <<http://www.usenix.org/event/hotcloud10/tech/full_papers/WangH.pdf>>, USENIX Association, Proceedings of USENIX Conference on Hot Topics in Cloud Computing (HotCloud), 2010, pp. 1-7.

Wang, et al., "The Impact ofVirtualization on Network Performance of Amazon EC2 Data Center", retrieved on Apr. 5, 2011 at <<http://ieeexplore.ieee.org/stamp/stamp.jsp?tp=&arnumber=5461931 >>, IEEE Press, Proceedings of Conference on Information Communication (INFOCOM), 2010, pp. 1163-1171.

Yu, et al., "Rethinking Virtual Network Embedding: Substrate Support for Path Splitting and Migration", retrieved on Apr. 5, 2011 at <<http://www.cs.princeton.edu/-minlanyu/writeup/CCR08.pdf>>, ACM SIGCOMM Computer Communication Review, vol. 38, No. 2, Apr. 2008, pp. 17-29.

Zaharia, et al., "Improving MapReduce Performance in Heterogeneous Environments", retrieved on Apr. 5, 2011 at <<http://bnrg.eecs.berkeley.edu/-randy/Courses/CS268.F08/papers/42_osdi_08.pdf>>, Proceedings of USENIX Conference on Operating Systems Design and Implementation (OSOi), Dec. 2008, pp. 29-42.

* cited by examiner

OFFERING NETWORK PERFORMANCE GUARANTEES IN MULTI-TENANT DATACENTERS

RELATED APPLICATION

This application is a continuation of, and claims priority to, U.S. patent application Ser. No. 13/176,901, filed Jul. 6, 2011, and entitled "OFFERING NETWORK PERFORMANCE GUARANTEES IN MULTI-TENANT DATACENTERS". The disclosure of the above-identified application is hereby incorporated by reference in its entirety as if set forth herein in full.

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

There is an increasing demand for datacenters which offer on-demand use of computing resources. Such datacenters share resources between multiple tenants and as a result, the performance experienced by one tenant may be influenced by the activities of the other tenants of the datacenter and can be highly variable. This variability can have negative consequences for both tenants and datacenter providers. The tenants may experience unpredictable application performance and increased tenant cost (because cost is based on the time spent using the resources). This in turn renders such datacenters unsuitable for some applications which rely on predictable performance and the variability further results in reduced datacenter throughput (and hence datacenter efficiency) and revenue loss for the provider.

The embodiments described below are not limited to implementations which solve any or all of the disadvantages of known methods of managing datacenters.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Methods of offering network performance guarantees in multi-tenant datacenters are described. In an embodiment, a request for resources received at a datacenter from a tenant comprises a number of virtual machines and a performance requirement, such as a bandwidth requirement, specified by the tenant. A network manager within the datacenter maps the request onto the datacenter topology and allocates virtual machines within the datacenter based on the available slots for virtual machines within the topology and such that the performance requirement is satisfied. Following allocation, stored residual capacity values for elements within the topology are updated according to the new allocation and this updated stored data is used in mapping subsequent requests onto the datacenter. The allocated virtual machines form part of a virtual network within the datacenter which is allocated in response to the request and two virtual network abstractions are described: virtual clusters and virtual oversubscribed clusters.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

One solution to the problem of performance variability within a cloud computing environment is to provide each tenant with compute instances connected through a dedicated network having a particular guaranteed bandwidth (e.g. 10 Gbs). However, this solution can lead to inefficient use of cloud computing resources, increased provisioning costs for the datacenter provider (as they need to build a bulky datacenter network) and significantly increased tenant costs (e.g. costs of 5-10 times more than standard instances).

Figure 1:
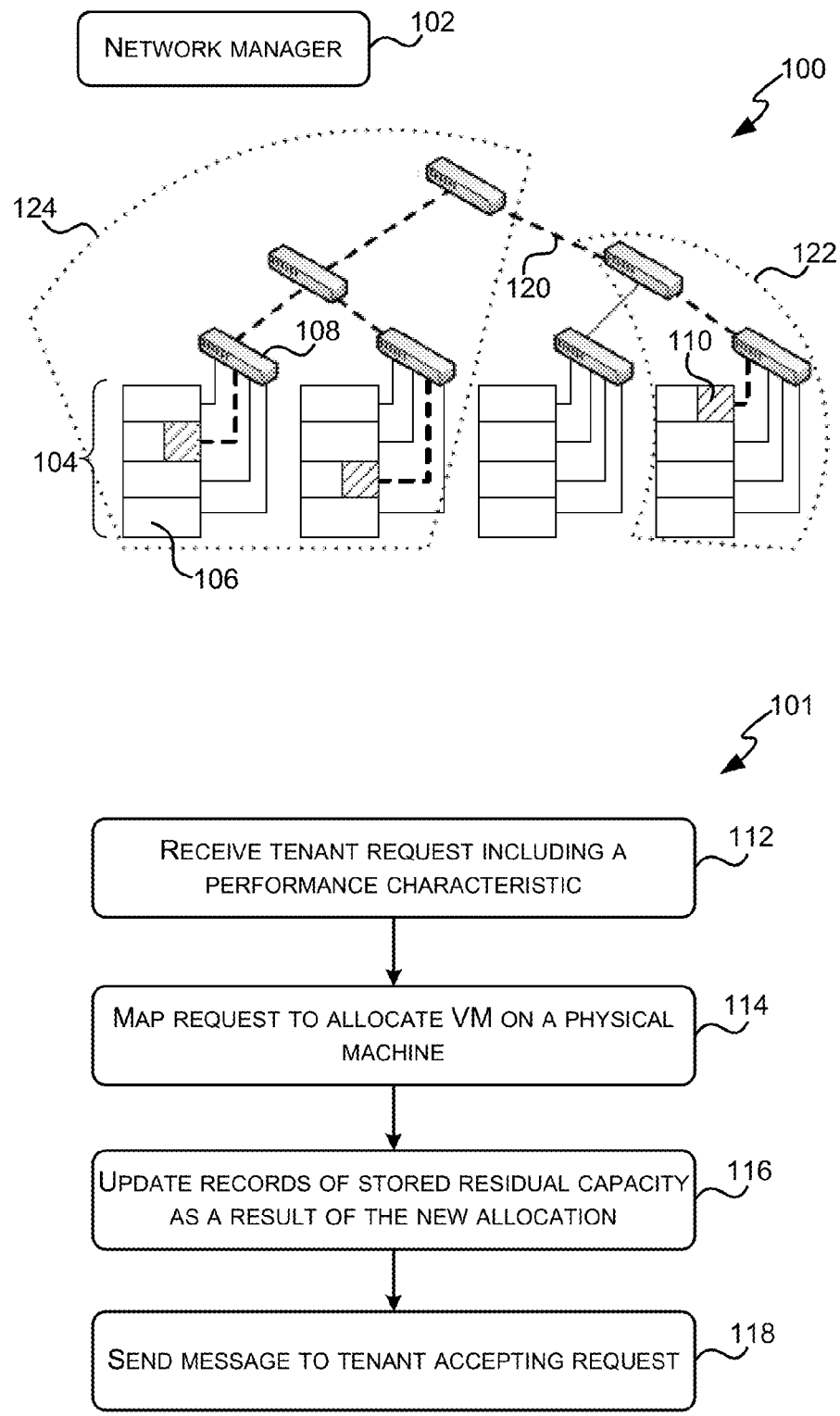
FIG. 1 shows a schematic diagram of a multi-tenant datacenter and a flow diagram of an example method of operation of a network manager within that datacenter.

FIG. 1 shows a schematic diagram 100 of a multi-tenant datacenter and a flow diagram 101 of an example method of operation of a network manager 102 within that datacenter. The multi-tenant datacenter (e.g. a cloud datacenter or a production datacenter), comprises racks 104 of physical machines 106 interconnected by switches 108. This arrangement of machines interconnected by switches which forms the datacenter may also be referred to as a datacenter network and references to 'the network' in the following description relate to this datacenter network of machines and switches. It will be appreciated that the datacenter may comprise many more machines and switches than shown in FIG. 1 and that the overall datacenter may not have a tree structure such as shown in FIG. 1 (for example, there may be additional links between racks/machines which are not shown in FIG. 1 and many more racks and switches). Each machine 106 has a number of slots for virtual machines which can be allocated to tenants of the datacenter and in the example shown in FIG. 1, each machine has two slots and slots 110 which are allocated to a particular tenant are shown as shaded squares. The allocation of these virtual machines (VMs) is performed by a network manager 102 (which may also be referred to as an 'admission control entity').

The network manager (NM) 102 is a logically centralized entity which, upon receiving a tenant request, performs admission control and maps the request to physical machines to allocate VMs. In performing the allocation, the NM takes into account available network resources and resources which have been reserved in response to previous tenant requests across the physical network. In order to do this, the NM maintains one or more data structures which contain the following information:

- the datacenter network topology;
- the residual capacity for elements in the network (e.g. the residual capacity, such as bandwidth, for each link in the network); and
- the empty slots on each physical machine (which are therefore available for allocation in response to a request from a new or existing tenant).

The NM may also store other information, such as allocation information for existing tenants, including the physical machines they are allocated to, the network routes between these machines and the capacity which is reserved for the tenant at links along these routes. Such information, whilst not essential, may be used in migrating tenants in the case of machine failure or network upgrade or may be used in releasing resources when tenants no longer require them.

The flow diagram 101 in FIG. 1 shows an example method of operation of the NM. The NM receives a tenant request which includes the number of virtual machines being requested, N, and a requested performance characteristic (block 112), in contrast with existing cloud datacenters where tenants simply ask for the amount of computing and storage resources they require. The VMs may have varying amounts of CPU, memory and storage resources (and this may also be specified by the tenant as part of the request). The performance characteristic, which is specified by the tenant (rather than being a value set by the datacenter provider), may be defined in terms of a bandwidth, B, which is the maximum rate at which any VM can send or receive. In other examples, other performance metrics may be used, such as delay or jitter. The NM then maps the request to allocate the requested number of VMs on physical machines (block 114). The stored residual capacity data for elements in the network is used in performing this allocation (in block 114) and the form of the stored data and the type of elements to which the data relates may be dependent upon the particular performance metric which is used. For example, where tenants specify a bandwidth requirement, B, the residual capacity data may comprise the residual bandwidth for each link in the network.

Having allocated the VMs to satisfy the tenant request, the stored data is updated to take into account the new allocation (block 116), e.g. by updating the residual capacity values stored for elements in the network and by removing those slots which have been allocated from the list of empty (and hence available) slots. The tenant is also informed that the request has been accepted (block 118). If the method fails and is unable to allocate VMs to satisfy the request, the request is rejected (not shown in FIG. 1).

The NM may be considered to operate in a management plane to perform the VM allocation. In some examples, there may also be control in a data plane to enforce the performance characteristic specified by the tenant, which may be considered in many circumstances to be a performance limit (or cap), within the network itself and enforcement modules within the network may be used. In an example, the performance characteristic (which may also be referred to as a performance metric, performance requirement, performance parameter or performance criterion) may be the bandwidth, B, which specifies the maximum send/receive rate from any VM and in such an example, an enforcement module within each machine 106 may perform rate-limiting or otherwise enforce the bandwidth available at each VM. This is described in more detail below. In other examples, an enforcement module may be located elsewhere within the network, e.g. at a rack level or in a switch 108.

Figure 2:
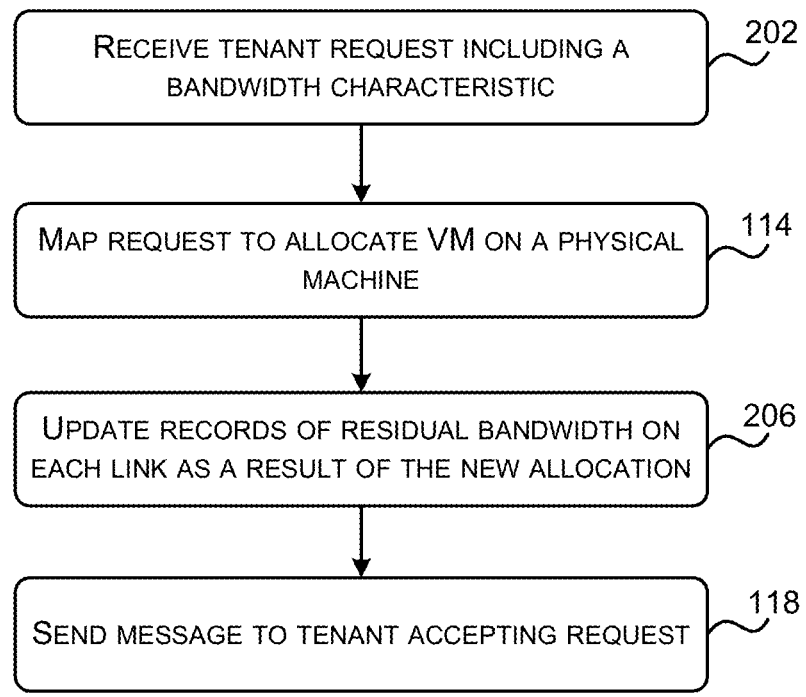
FIG. 2 shows a flow diagram of another example method of operation of a network manager.

FIG. 2 shows a flow diagram of another example method of operation of a network manager. In this example, the performance metric which is used and specified in the tenant request is the bandwidth B, as defined above. As a result the tenant request, r, which is received (in block 202) comprises a bandwidth characteristic (or bandwidth requirement), B, and a number of VMs required, N, r:<N,B>. As described in further examples below, the tenant request may also include other parameters and in some examples there may be different bandwidths specified for different VMs, e.g. r:<N, $B_1, B_2, \ldots, B_N$>. The NM maps the request to allocate VMs according to the request received (block 114) and updates records of residual bandwidth of each link in the network as a result of the new allocation (block 206). A message is also sent in response to the request which accepts the request (block 118). Again as described above, if the allocation fails, the tenant request is rejected.

In mapping the request received from a tenant (in block 112 or 202) to allocate VMs (in block 114), the method not only allocates VMs to tenants but through the reserving of network resources, also provides a virtual network connecting a tenant's VM instances. The virtual network isolates tenant performance from the underlying infrastructure and provides the performance guarantees requested by the tenant. Use of virtual networks also enables a datacenter provider to modify their physical topology (or even completely alter their infrastructure or physical topology) without impacting tenants (i.e. as long as the existing virtual networks are mapped onto the new physical topology). The tenants will be unaware of any such changes.

Figure 3:
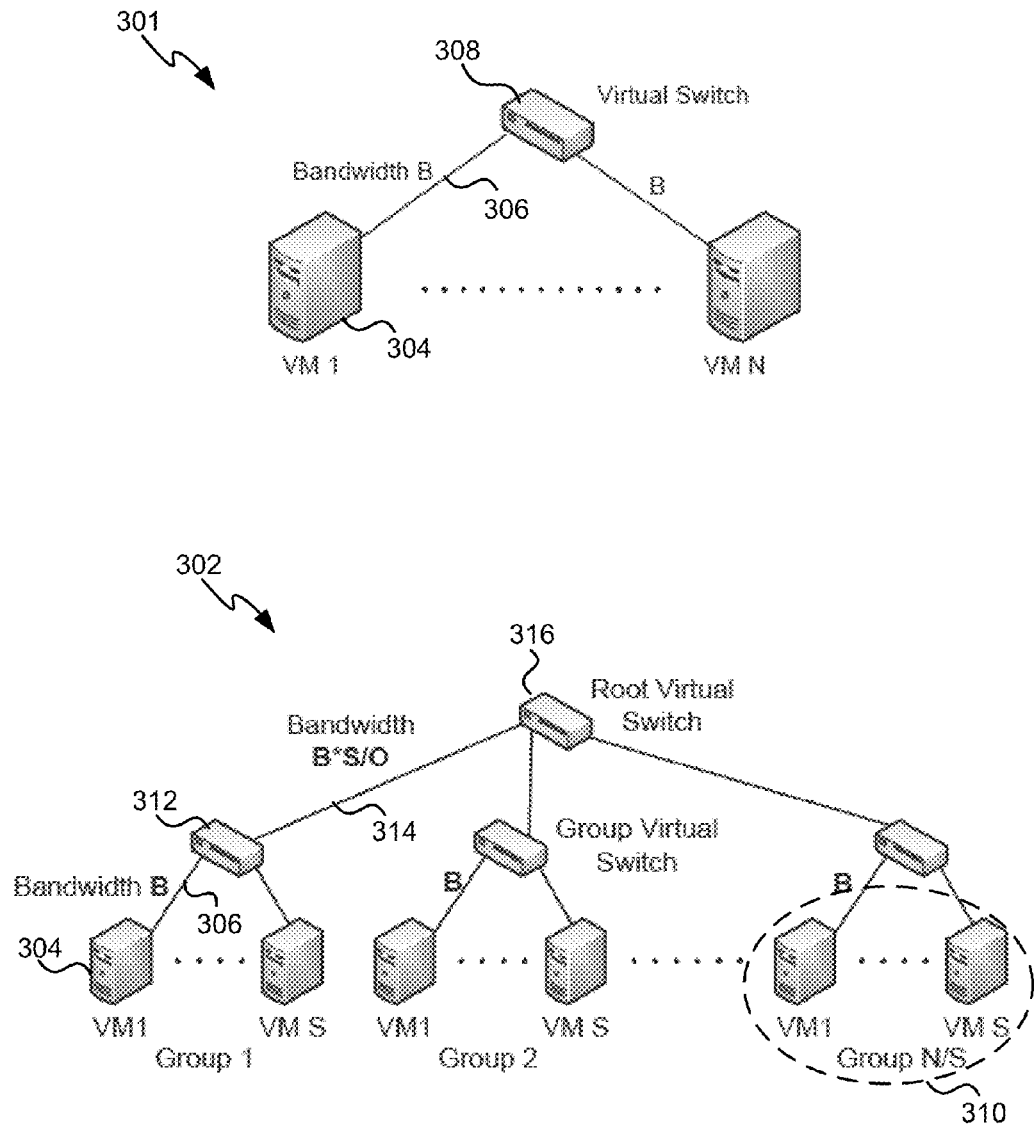
FIG. 3 shows schematic diagrams of two virtual network abstractions which may be used in allocation of virtual machines.

FIG. 3 shows schematic diagrams of two virtual network abstractions which may be used in allocation of VMs: the virtual cluster 301 and the virtual oversubscribed cluster 302. Each is formed from a number of VMs 304 connected by links 306, 314 and virtual switches 308, 312, 316. The virtual cluster 301 is suited for data-intensive applications like MapReduce and BLAST and the virtual oversubscribed cluster 302 is a tree-like structure which suits applications that feature local communication patterns. These abstractions allow tenants to reason in an intuitive way about the network performance of their application when running atop the virtual network and enable providers to multiplex many virtual networks on their physical network. Through this multiplexing, the amount of sharing is increased which reduces tenant costs and makes provider revenues more attractive. These abstractions 301, 302 and example allocation algorithms used for each abstraction are described in more detail below.

With a virtual cluster 301, a tenant request <N,B> provides the following topology: each tenant machine 304 is connected to a virtual switch 308 by a bidirectional link 306 of capacity B, resulting in a one-level tree topology. The virtual switch 308 has a bandwidth of N*B. This means that the virtual network has no oversubscription and the maximum rate at which the tenant VMs can exchange data is N*B. However, this data rate is only feasible if the communication matrix for the tenant application ensures that each VM sends and receives at rate B. Alternatively, if all N tenant VMs were to send data to a single destination VM, the data rate achieved will be limited to B.

With a virtual oversubscribed cluster 302, a tenant request <N,B,S,O> includes additional information. Tenant machines are arranged in groups of size S (as indicated by the dotted outline 310 in FIG. 3), resulting in P=N/S groups. In the following description, all the groups are shown as being of the same size (i.e. comprising the same number of virtual machines), however, in some examples groups within a virtual oversubscribed cluster may be of different sizes and in such an example, the request may include this information, e.g. <N,B,$S_1,S_2,\ldots,S_P$,O>. The VMs 304 in a group are connected by bidirectional links of capacity B to a (virtual) group switch 312 (which has a bandwidth of S*B). The group switches 312 are further connected using a link 314 of capacity B'=(S*B)/O to a (virtual) root switch 316 (which has a bandwidth of N*B/O). The resulting topology has no oversubscription for intra-group communication through the group switches 312. However, inter-group communication has an oversubscription factor O, i.e. the aggregate bandwidth at the VMs is O times greater than the bandwidth at the root switch 316. The oversubscription factor O neither depends upon, nor requires physical topology oversubscription and in a similar manner to the size S, the oversubscription factor O may be different for different groups.

The maximum data rate with the virtual oversubscribed cluster topology is still N*B. Yet, the localized nature of the tenant's bandwidth demands resulting from this abstraction allows the provider to fit more tenants on the physical network. Compared to virtual cluster, this virtual oversubscribed cluster (VOC) abstraction does not offer as dense a connectivity but has the potential to significantly limit tenant costs. Hence, in effect, by incentivizing tenants to expose the flexibility of their communication demands, the VOC abstraction achieves better multiplexing which benefits both tenants (by reducing costs) and providers (by improving provider flexibility).

The term 'virtual switch' is used for the switches in both virtual network abstractions because one or more switches in the physical topology may form the virtual switch, with the switching functionality of the virtual switch being distributed between these physical switches. This is shown in the topology of FIG. 1, where the set of switches 108 and links form a distributed virtual switch for the tenant with the three VMs 110.

In order to allocate a virtual cluster 301 of VMs (in block 114) an allocation algorithm is used and for the purposes of the following description, bandwidth B is used as the performance characteristic which is specified within a tenant request. This allocation algorithm identifies which allocations of VMs are valid where validity is defined in terms of two constraints (which may also be referred to as 'validity conditions'): there must be an available slot for a VM on the relevant machine and the tenant's bandwidth characteristic should be met on all links in the tenant tree (or more generally, the tenant's performance characteristic must be met at all entities in the tenant tree). Given that, as shown in the first example in FIG. 3, the tenant's virtual switch 308 has a bandwidth of N*B one option would be to ensure that there was N*B residual capacity on each link in the tree; however, this is inefficient as can be described with reference to FIG. 1. In the diagram 100 in FIG. 1, a tenant tree is shown by the dashed lines between switches 108 and racks 104 and comprises three VMs 110. If a particular link 120 in the tree is considered, removing this link from the tree leads to two components 122, 124; if the first one contains m VMs, the other (by definition) contains (N−m) VMs. The virtual topology dictates that a single VM cannot send or receive at rate more than B. Hence, traffic between these two components is limited to min(m, N−m)*B (or in this particular example, to B, as m=2 and N=3). This is the bandwidth required for the tenant on this link (and is less than N*B).

Figure 4:
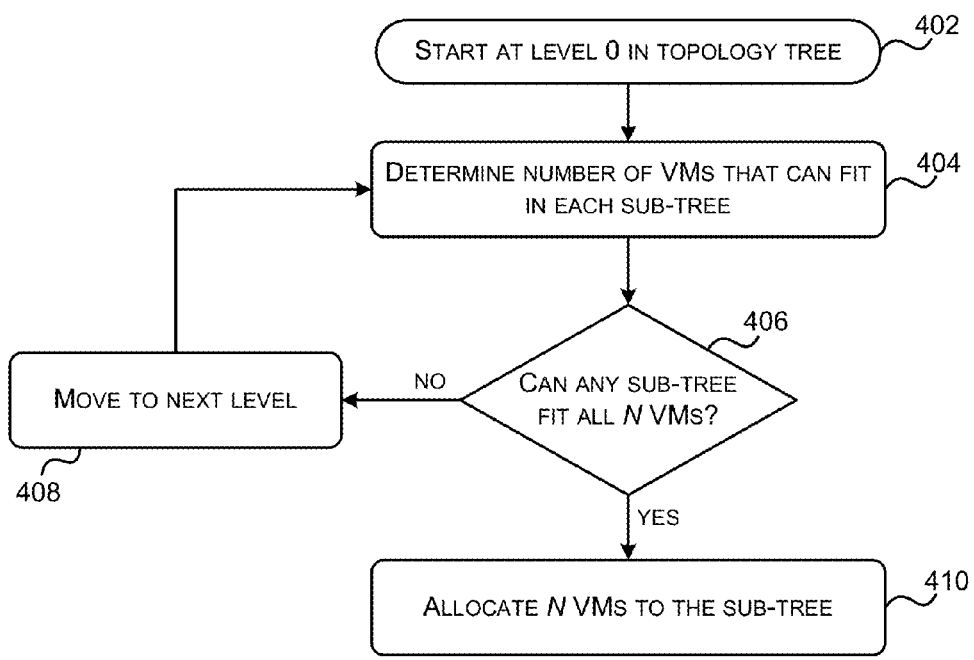
FIG. 4 is a flow diagram of an example allocation algorithm for allocating virtual cluster requests.

FIG. 4 is a flow diagram of an example allocation algorithm for allocating virtual cluster requests. This algorithm may be referred to as a greedy allocation algorithm as the algorithm does not attempt to find the optimal allocation but instead tries to serve requests based on a heuristic, e.g. greedily allocating VMs as close as possible in the physical topology. As described above, the number of tenant VMs that can be allocated to a sub-tree (a machine, a rack, a pod, where a pod is a set of racks) is constrained by two factors. The first is the number of empty VM slots in the sub-tree. The second is the residual bandwidth on the physical link connecting the sub-tree to the rest of the network. This link should be able to accommodate the bandwidth requirements of the VMs placed inside the sub-tree. Given the number of VMs that can be placed in any sub-tree subject to the two constraints, the algorithm finds the smallest sub-tree that can fit all tenant VMs.

Each physical machine in the datacenter has K slots where VMs can be placed, while each link has capacity C. Further, $k_v$ is the number of empty slots in the sub-tree v (e.g. in a machine at level 0 $k_v \in [0,K]$), while $R_l$ is the residual bandwidth for link l. Starting with a machine as the base case, which may be considered to be one of the leaves in the tree (level 0) the number of VMs for request r that can be allocated to a machine v with outbound link l is given by the set $M_v$:

$$M_v = \{m \in [0, \min(k_v, N)] \text{ s.t. } \min(m, N-m)*B \le R_l\} \quad (1)$$

To explain this constraint, a scenario may be considered where m (<N) VMs are placed at the machine v. As described earlier, the bandwidth required on outbound link l, $B_{r,l}$ is min(m,N−m)*B. For a valid allocation, this bandwidth should be less than the residual bandwidth of the link. Note that in a scenario where all requested VMs can fit in v (i.e. m=N), all communication between the VMs is internal to the machine. Hence, the bandwidth needed for the request on the link is zero. The same constraint can then extended to determine the number of VMs that can be placed in sub-trees at each level, i.e. at racks at level 1, pods at level 2 and onwards.

As shown in FIG. 4 and in the pseudo-code example below (which provides an example implementation of the method of FIG. 4), given the number of VMs that can be placed at each level of the datacenter hierarchy, the algorithm greedily tries to allocate the tenant VMs to the lowest level possible. To achieve this, the method traverses the topology tree starting at the leaves (physical machines at level 0, block 402) and determines if all N VMs can fit in any sub-tree at this level (blocks 404-406 and lines 2-10). This involves determining the number $M_v$ of VMs that can fit in each sub-tree v at that level (level 0, block 404, lines 3-4) and then comparing the computed value to the required number of VMs, N (block 406, line 5). Equation (1) above defines the value of $M_v$ in this situation. If none of the sub-trees at this level (i.e. none of the physical machines for level 0) can accommodate all of the required VMs ('No' in block 406), the algorithm moves to the next level (block 408) and repeats the process (blocks 404 and 406), e.g. to determine if any of the racks (at level 1) can accommodate all of the required VMs. Once the algorithm determines a sub-tree that can accommodate the VMs ('Yes' in block 406, line 5), it allocates the empty slots on physical machines in the sub-tree to the tenant (block 410, line 6 using the 'Alloc' function set out in lines 11-22). If the algorithm reaches the top level without finding any sub-tree that can accommodate all of the required VMs (line 9) then the tenant's request is rejected (line 10). As described above and shown in FIG. 2, once the assignment of VMs has been done, the bandwidth needed for the request is effectively reserved for the tenant by updating the residual bandwidth for each link l as $R_l = R_l - B_{r,l}$ (block 206).

```
Require: Topology tree T
Ensure: Allocation for request r :< N,B >
1: l = 0 //start at level 0, i.e. with machines
2: while true do
3:   for each sub-tree v at level l of T do
4:     Calculate M_v //v can hold M_v VMs
5:     if N ≤ max(M_v) then
6:       Alloc(r, v, N)
7:       return true
8:   l = l + 1 // move to higher level in T
9:   if l == height(T) then
10:      return false //reject request
//Allocate m VM slots in sub-tree v to request r
11: function Alloc(r, v, m)
12: if (level(v) ==0) then
13:   // Base case – v is a physical machine
14:   Mark m VM slots as occupied
15:   return m
16: else
17:   count = 0 //number of VMs assigned
18:   //Iterate over sub-trees of v
19:   for each sub-tree w in v do
20:     if count < m then
21:       count +=Alloc(r, w, min(m – count; max(M_w)))
22:   return count
```

The fact that the physical datacenter network topologies are typically oversubscribed (i.e. they have less bandwidth at root than edges) guides the algorithm's optimization heuristic. To maximize the possibility of accepting future tenant requests, the algorithm allocates a request while minimizing the bandwidth reserved at higher levels of the topology. This is achieved by packing the tenant VMs in the smallest sub-tree.

Further, when multiple sub-trees are available at the same level of hierarchy, an implementation of the algorithm chooses the sub-tree with the least amount of residual bandwidth on the edge connecting the sub-tree to the rest of the topology. This preserves empty VM slots in other sub-trees that have greater outbound bandwidth available and hence, are better positioned to accommodate future tenants.

The allocation algorithm described above with reference to FIG. 4 and the example pseudo-code searches for suitable sub-trees by traversing the network from bottom (level 0) to top. In other examples, different heuristics may be used, for example the algorithm may be modified to search from the top to the bottom. Furthermore, the algorithm may be modified to pack VMs into the datacenter topology in a different way. In an example, a utility function that maximizes an aspect of the network performance/layout or a combination of such aspects may be used e.g. a packing function which aims to reduce fragmentation across the network, a balancing function which balances CPU and network utilization across the network etc. In a further example, a packing function may be used which strives for data locality (i.e. putting VMs close to where the tenant data is).

Figure 5:
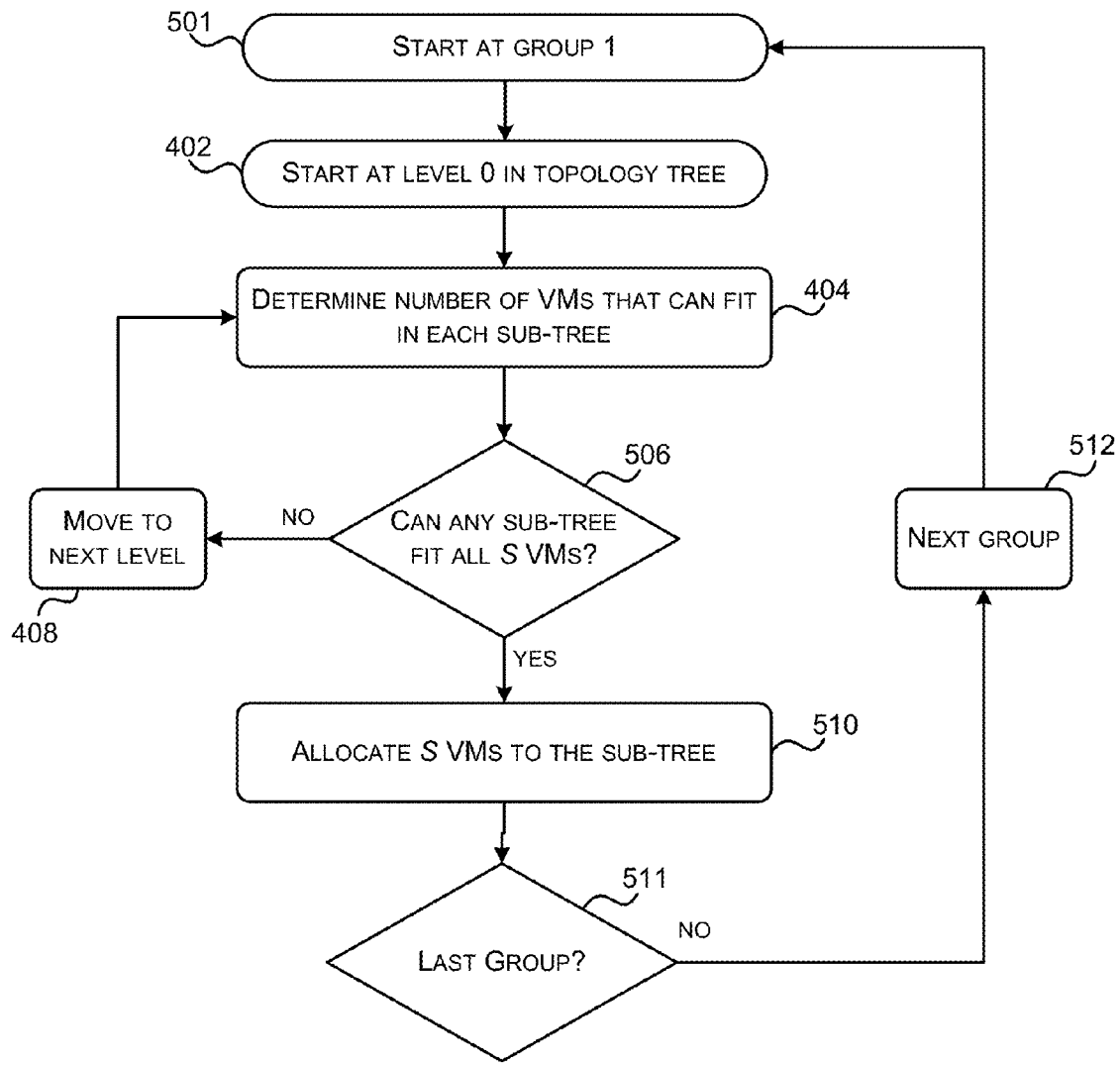
FIG. 5 is a flow diagram of an example allocation algorithm for allocating virtual oversubscribed cluster requests.

FIG. 5 is a flow diagram of an example allocation algorithm for allocating virtual oversubscribed cluster requests. As described above, a virtual oversubscribed cluster request, r:<N,S,B,O>, requires NVMs arranged in groups of size S. VMs within the same group are connected by links of bandwidth B to a virtual switch and inter-group bandwidth is given by B'=S*B/O. For the purpose of the following description, it is assumed that the size of each group is the same, S; however, as described above and in a similar manner to the way that the value B need not be the same for all VMs, the size of each group may be different: $S_1, S_2, \ldots, S_P$ and/or the oversubscription factor may be different for different groups: $O_1, O_2, \ldots, O_P$ (so in its most generic form, r:<N, $S_1, S_2, \ldots, S_P, B_1, B_2, \ldots, B_N, O_1, O_2, \ldots, O_P$>).

Figure 6:
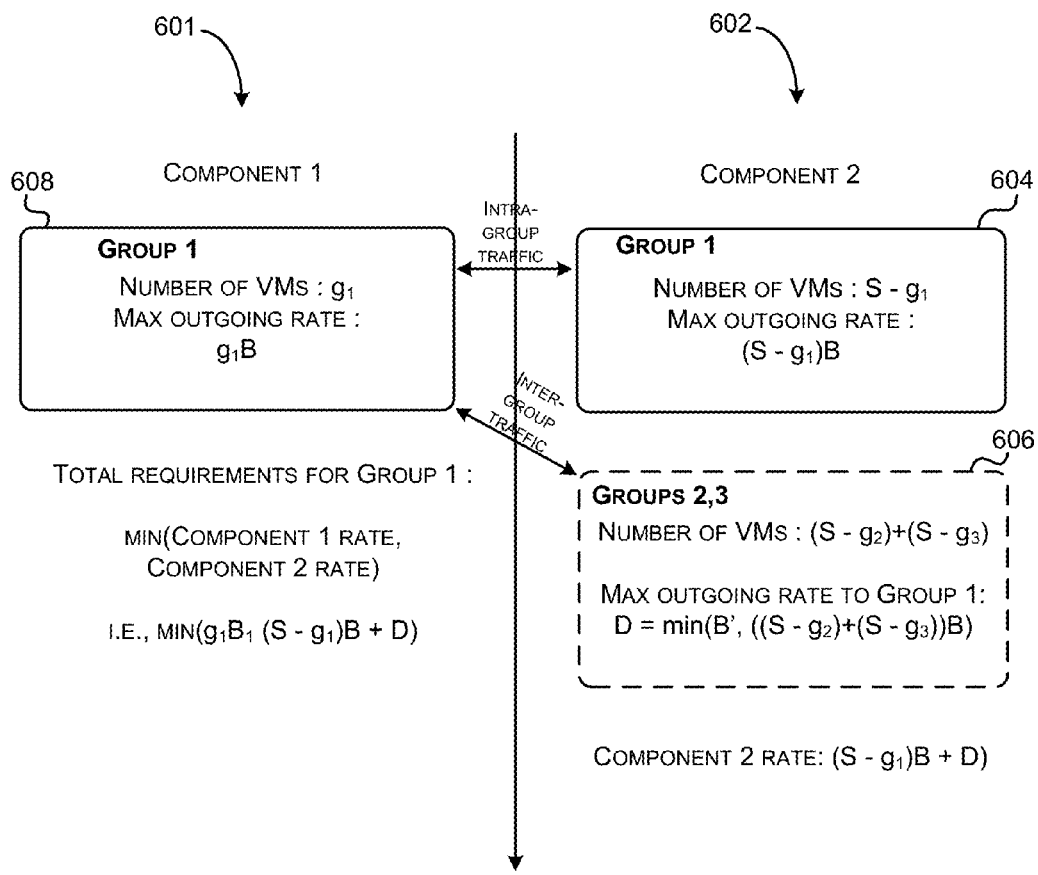
FIG. 6 is a schematic diagram illustrating the bandwidth required by a group of virtual machines on a link dividing the tenant tree into two components.

If a request with three groups is considered, by way of example, as with the virtual cluster, any physical link in the tenant tree divides the tree into two components. If $g_i$ denotes the number of VMs of group i that are in the first component, this implies that the rest are in the second component ($S-g_i$). The bandwidth required by the request on the link between the two components is the sum of the bandwidth required by individual groups. FIG. 6 shows a schematic diagram which illustrates the bandwidth required by group 1 VMs on a link dividing the tenant tree into two components 601, 602. In the first component, the group 1 traffic on the link in question comprises the intra-group traffic to group 1 VMs 604 in the second component and inter-group traffic to group 2 and 3 VMs 606 in the second component.

In the first component 601, group 1 VMs 608 cannot send (or receive) traffic at a rate more than g*B. In the second component 602, group 1 VMs 604 cannot receive (or send) at a rate more than $(S-g_1)*B$ while the rate for VMs 606 of other groups cannot exceed the inter-group bandwidth B'. The rate, D, of these other VMs is further limited by the aggregate bandwidth of the group 2 and 3 members in the second component, i.e. $((S-g_2)+(S-g_3))*B$. Hence, as shown in FIG. 6, the total bandwidth needed by group 1 of request r on link 1, is $B_{r,1,l}=\min(g_1*B,(S-g_1)*B+D)$, where D=min (B', $((S-g_2)+(S-g_3))*B$). Finally, the total bandwidth required on the link is the sum across all three groups, i.e.

$$\Sigma_{i=[1,3]} B_{r,i,l}$$

Generalizing the analysis above, the bandwidth required for group i on link l is given by $$B_{r,i,l}=\min(g_1*B,(S-g_i)*B+\min(B',\Sigma_{j=i}(S=g_j)*B))$$

The bandwidth to be reserved on link l for request r is the sum across all the groups, i.e. $B_{r,l}=\Sigma_{i=1}^{P} B_{r,i,l}$. For the allocation to be valid, link 1 must have enough residual bandwidth to satisfy $B_{r,l}$. Hence, $B_{r,l} \leq R_l$ is the validity condition.

Allocating an oversubscribed cluster involves allocating a sequence of virtual clusters (<S,B>) for individual groups, as shown in FIG. 5. This allows reuse of the cluster allocation algorithm (as shown by the commonality between FIGS. 4 and 5). Hence, the allocation for a request r proceeds one group at a time. The flow diagram shown in FIG. 5 starts with group 1; however, for the purposes of generality of the following description, it is assumed that groups 1 to (i-1) have already been allocated (through iterations of the method of FIG. 5) and therefore the next allocation to be performed is for the VMs of group i. As with the cluster allocation algorithm described above, the number of VMs for this group that can be assigned to each sub-tree is determined (block 404) and there are a number of constraints which set this value. If a sub-tree with outbound link l already containing $g_j$ members of group j, j∈[1,i-1], is considered using the analysis above, the conditional bandwidth needed for the $j^{th}$ group of request r on link l is:

$$CB_{r,j,l}(i-1) = \min(g_j \cdot B, (S-g_j) \cdot B + \min(B', E)$$

where, $$E = \Sigma_{k=1, k=j}^{i-1}(S-g_k) \cdot B + \Sigma_{k=i}^{P} S \cdot B$$

This bandwidth is conditional since groups i, ..., P remain to be allocated. A conservative assumption is to assume that all subsequent groups will be allocated outside the sub-tree and as a result link l will have to accommodate the resulting inter-group traffic. Hence, if $g_i$ members of group i were to be allocated inside the sub-tree, the bandwidth required by groups [1,i] on l is at most $E_{j=1}^{i} CB_{r,j,l}$ (i). Consequently, the number of VMs for group i that can be allocated to sub-tree v, designated by the set $M_{v,i}$, is:

$$M_{v,i} = \{g_i \in [0, \min(k_v, S)] \text{ s.t. } \Sigma_{j=1}^{i} CB_{r,j,l}(i) \leq R_l\} \quad (2)$$

Consequently, when determining the number of VMs that can fit in each sub-tree, equation (1) is used for virtual cluster allocation (as in FIG. 4) and equation (2) is used for allocating a group within the virtual oversubscribed cluster allocation algorithm (as in FIG. 5). With this change in definition, the example pseudo-code given above may also be used in allocation of groups within the virtual oversubscribed cluster allocation algorithm.

Given the number of VMs that can be placed in sub-trees (as determined in block 404 using equation (2) above) at each level of the datacenter hierarchy, the allocation algorithm proceeds to allocate VMs for individual groups using the algorithm as described above. If any sub-tree at the particular level can accommodate all S VMs in the group ('Yes' in block 506), these are allocated (in block 510). However, if there are no sub-trees at the particular level that can accommodate all the VMs of the group ('No' in block 506), the analysis (blocks 404 and 506) is repeated at the next level (block 408). Once a group has been allocated, the algorithm moves to the next group (block 512) if the last group has not been allocated ('No' in block 511) and a request is accepted (and an acceptance message sent to the tenant in block 118) if all groups are successfully allocated. If it is not possible to allocate all the groups, the request is rejected.

Figure 7:
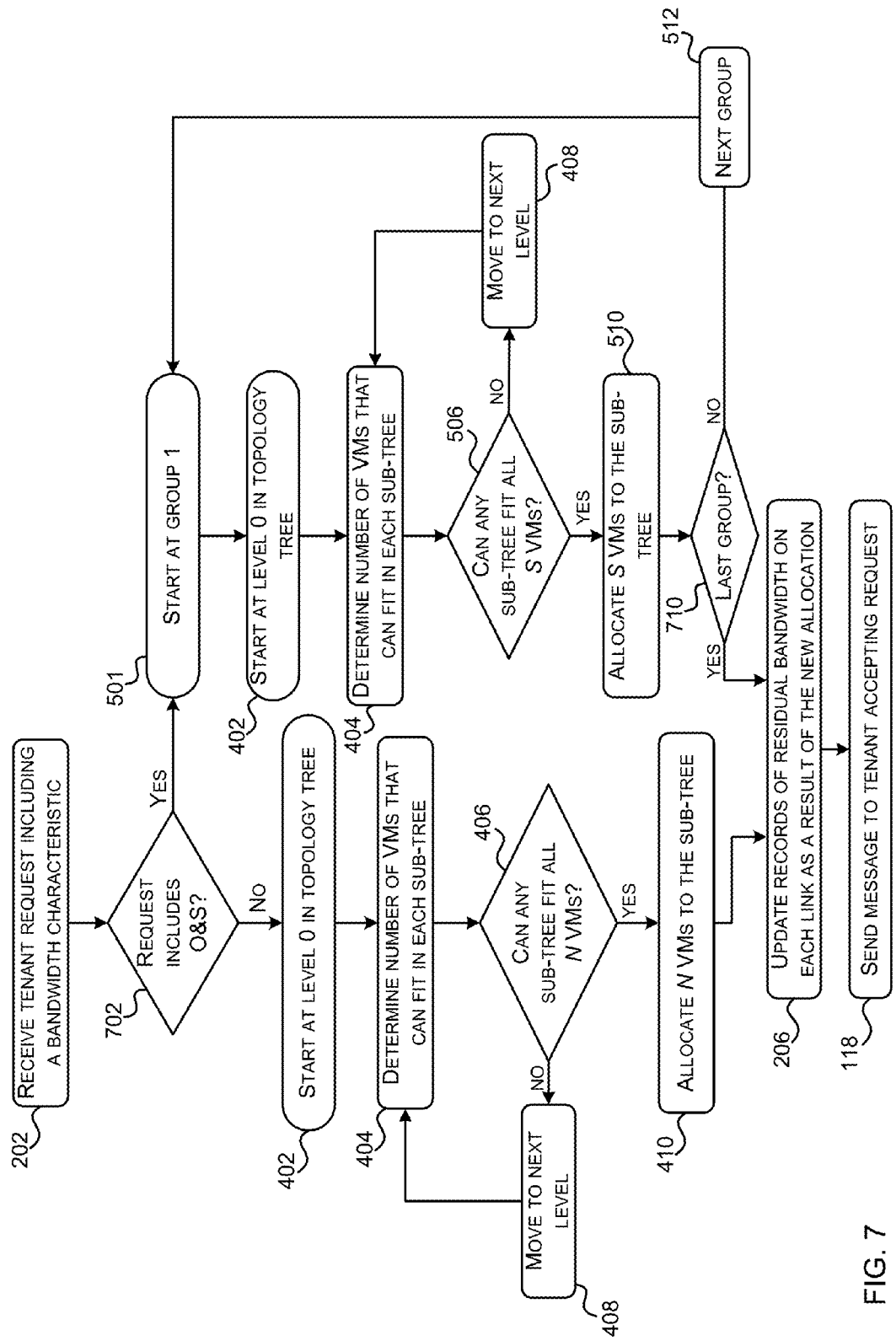
FIG. 7 shows a flow diagram of another example method of operation of a network manager.

FIG. 7 shows a flow diagram of another example method of operation of a network manager where bandwidth is used as the performance characteristic specified by the tenant in the request. It can be seen that this flow diagram combines elements from the methods shown in FIGS. 2, 4 and 5 above and allows a tenant to request either a virtual cluster (VC) abstraction (through provision of a request comprising N and B) or a virtual oversubscribed cluster abstraction (through provision of a request comprising N, B, S and O), as differentiated in block 702. If a virtual cluster request is received (in block 202, resulting in 'No' in block 702), then the VM allocation proceeds as described above with reference to FIG. 4. If, however, a VOC request is received ('Yes' in block 702), the VM allocation proceeds as described above with reference to FIG. 5. In this situation, the allocation is repeated for each group, until the last group is reached ('Yes' in block 710). Once all VMs have been allocated (using the appropriate method), the residual bandwidth values for each link are updated (block 206) and then a message is sent to the tenant accepting the request (block 118). If the allocation of VMs fails, the request is not accepted, but is instead rejected (not shown in FIG. 7).

The constraints (or validity conditions) used in the methods described above are based on the number of available slots and the available capacity (e.g. bandwidth) or other performance metric. These conditions enable the validity checks to be performed very quickly and on a per-tenant basis when allocating VMs (without requiring the whole traffic matrix) and so can be implemented at a large enough scale to be applicable to datacenters.

Irrespective of whether one or both of the abstractions described above are used in a datacenter implementation, tenants are provided with simple and intuitive interfaces so that they can express performance guarantees (e.g. bandwidth guarantees).

Using the methods described above for either VC or VOC or a combination of the two, the NM ensures that the physical links connecting a tenant's VMs have sufficient bandwidth. As mentioned above, a datacenter may also include mechanisms to enforce tenant virtual networks, i.e. to ensure that tenants do not use more capacity (e.g. bandwidth) than has been reserved for them. In an example implementation, individual VMs are rate limited using explicit bandwidth reservations at switches; however the limited number of reservation classes on existing commodity switches implies that such a solution does not currently scale well with the number of tenants.

Figure 8:
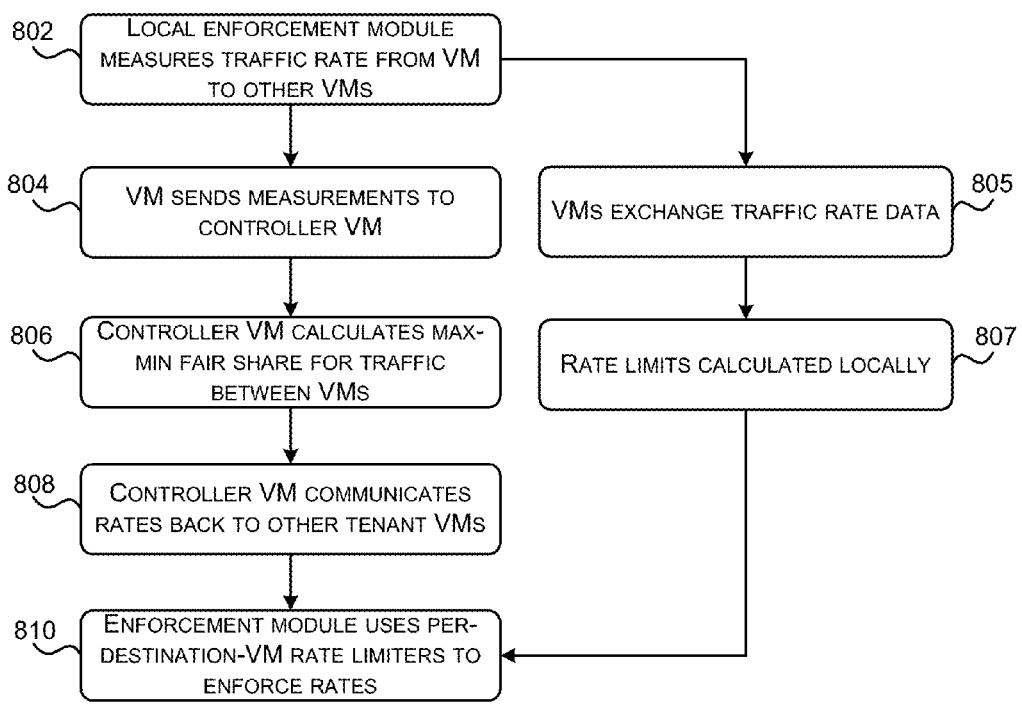
FIG. 8 is a flow diagram of two example methods of endhost based rate enforcement.

In another example, endhost based rate enforcement may be used in which traffic to and from each VM is limited in accordance with the tenant-specified performance characteristic (e.g. bandwidth characteristic). For each VM on a physical machine, an enforcement module resides in the OS (operating system) hypervisor. Given a tenant's virtual topology and the tenant traffic rate, it is feasible to calculate the rate at which pairs of VMs should be communicating. To achieve this, the enforcement module for a VM measures the traffic rate to other VMs (block 802), as shown in FIG. 8 which shows two example methods in a single flow diagram. In the first example method, these traffic measurements from all VMs for a tenant are periodically sent to a tenant VM designated as the controller VM (block 804) or to the NM or another entity within the datacenter. The enforcement module at the controller VM (or other entity, where appropriate) then calculates the max-min fair share for traffic between the VMs (block 806). These rates are communicated back to other tenant VMs (block 808) where the enforcement module for the VM uses per-destination-VM rate limiters to enforce the rates (block 810). The use of a controller VM (or other central controller entity) in this way reduces control traffic in the network. Alternatively, as shown in the second method in FIG. 8, the enforcement modules for an endhost may use a gossip protocol (or any suitable protocol) to exchange their traffic rates (block 805), so that rate limits can be computed locally (block 807) and then enforced as before (block 810).

In each of these methods the enforcement modules are effectively achieving distributed rate limits; for instance, with a cluster request <N,B>, the aggregate rate at which the tenant's VMs can source traffic to a destination VM cannot exceed B. The knowledge of the virtual topology makes it easier to determine the traffic bottlenecks and furthermore, as the computation is tenant-specific, the scale of the problem is reduced and this enables rates for each virtual network to be computed independently. Simulation results show that such an implementation scales well and imposes low communication overhead. The rate computation overhead depends on the tenant's communication pattern. Even for a tenant with 1000 VMs (two orders of magnitude more than mean tenant size today) and a worst-case scenario where all VMs communicate with all other VMs, the simulation results showed that the computation takes 395 ms at the 99th percentile. With a typical communication pattern, 99th percentile computation time is 84 ms. To balance the trade-off between accuracy and responsiveness of enforcement and the communication overhead, an example implementation may recompute rates periodically (e.g. every 2 seconds). For a tenant with 1000 VMs and worst-case all-to-all communication between the VMs, the controller traffic is 12 Mbps (~1 Mbps with a typical communication pattern).

In some multi-tenant datacenter implementations, some tenants may have guaranteed resources provided through allocation of a virtual network and other tenants may not have virtual networks (i.e. they may have dedicated VMs but without dedicated resources interconnecting those VMs). These tenants without virtual networks may, for example, be legacy tenants, or a provider may offer a different cost structure for provision of VMs with or without guaranteed resources. In such an instance, the datacenter may be controlled such that the network traffic for tenants without guaranteed resources gets a share (which may be a fair share) of the residual link bandwidth in the physical network. This may be achieved using two-level priorities, and as existing commodity switches offer priority forwarding, switch support for this may be used to provide these two-level priorities. Traffic from tenants with a virtual network may be marked as and treated as high priority, while other traffic is low priority. This prioritization when combined with the mechanisms above, ensures that tenants with virtual networks get the virtual topology and the bandwidth they ask for, while other tenants get their fair share of the residual network capacity. In a further optimization of performance for those tenants without virtual networks (e.g. so that the performance they experience is not too poor), a datacenter provider may limit the fraction of network capacity used for virtual networks (e.g. such that even without any tenants with a virtual network, the stored value of the residual capacity of a link, $R_l$, is less than the actual capacity of that link).

The allocation algorithms described above assume that the traffic between a given tenant's VMs is routed along a tree. This assumption holds trivially for simple tree physical topologies with a single path between any pair of machines. However, datacenters often have richer networks. For instance, a commonly used topology involves multiple layer 2 (L2) domains inter-connected using a couple of layers of routers. The spanning tree protocol ensures that traffic between machines within the same L2 domain is forwarded along a spanning tree. The IP routers are connected with a mesh of links that are load balanced using Equal Cost Multi-Path forwarding (ECMP). Given the amount of multiplexing over the mesh of links, these links can be considered as a single aggregate link for bandwidth reservations. Hence, in such topologies with limited path diversity, the physical routing paths themselves form a tree and the assumption still holds. The NM only needs to infer this tree to determine the routing tree for any given tenant. This can be achieved using SNMP queries of the 802.1D-Bridge MIB (Management Information Base) on switches (e.g. as supported by products like NetView and OpenView) or through active probing.

Data-intensive workloads in today's datacenters have motivated even richer, fat-tree topologies that offer multiple paths between physical machines. Simple hash-based or randomized techniques like ECMP and Valiant Load Balancing (VLB) are used to spread traffic across paths. Hence, tenant traffic would not be routed along a tree, and additional mechanisms may be needed to satisfy the assumption. For the purpose of bandwidth reservations, multiple physical links can be treated as a single aggregate link if traffic is distributed evenly across them. Today's ECMP and VLB implementations realize hash-based, per-flow splitting of traffic across multiple links. Variations in flow length and hash collisions can result in a non uniform distribution of traffic across the links. To achieve a uniform distribution, a centralized controller may be used to reassign flows in case of uneven load or distribute traffic across links on a per-packet basis, e.g., in a round-robin fashion.

Alternatively, the NM may control datacenter routing to actively build routes between tenant VMs, and backwards compatible techniques have been proposed to achieve this. With both SecondNet (as described in 'SecondNet: A Data Center Network Virtualization Architecture with Bandwidth Guarantees' by C. Guo et al and published in Proc. of ACM CoNext, 2010) and SPAIN (as described in 'SPAIN: COTS Data-Center Ethernet for Multipathing over Arbitrary Topologies' by J. Mudigonda et al and published in Proc. of NSDI, 2010), route computation is moved to a centralized component that directly sends routing paths to endhosts. The NM described above can adopt such an approach to build tenant-specific routing trees on top of rich physical topologies. The fact that there are many VMs per physical machine and many machines per rack implies that multiple paths offered by the physical topology can still be utilized.

Failures of physical links and switches in the datacenter will impact the virtual topology for tenants whose routing tree includes the failed element. With today's setup within datacenters, providers are not held responsible for physical failures and tenants end up paying for them. However, the systems and algorithms described above can be extended to determine the tenant VMs that need to be migrated, and reallocate them so as to satisfy the tenant's virtual topology. In such an implementation, the NM stores allocation information for existing tenants in addition to the datacenter network topology, the residual capacity for elements in the network and details of the slots on each physical machine which are available for allocation of a VM, and it is this allocation information which is used when a failure occurs. For instance, with a virtual cluster request, a failed edge (i.e. link) will divide a tenant's routing tree into two components. If the NM cannot find alternate links with sufficient capacity to connect the two components, it will reallocate the VMs present in the smaller component (using the algorithms described above). Further, such an extended allocation scheme can also accommodate tenant contraction and expansion wherein tenants want to decrease or increase the size of their virtual topology in an incremental fashion.

Figure 9:
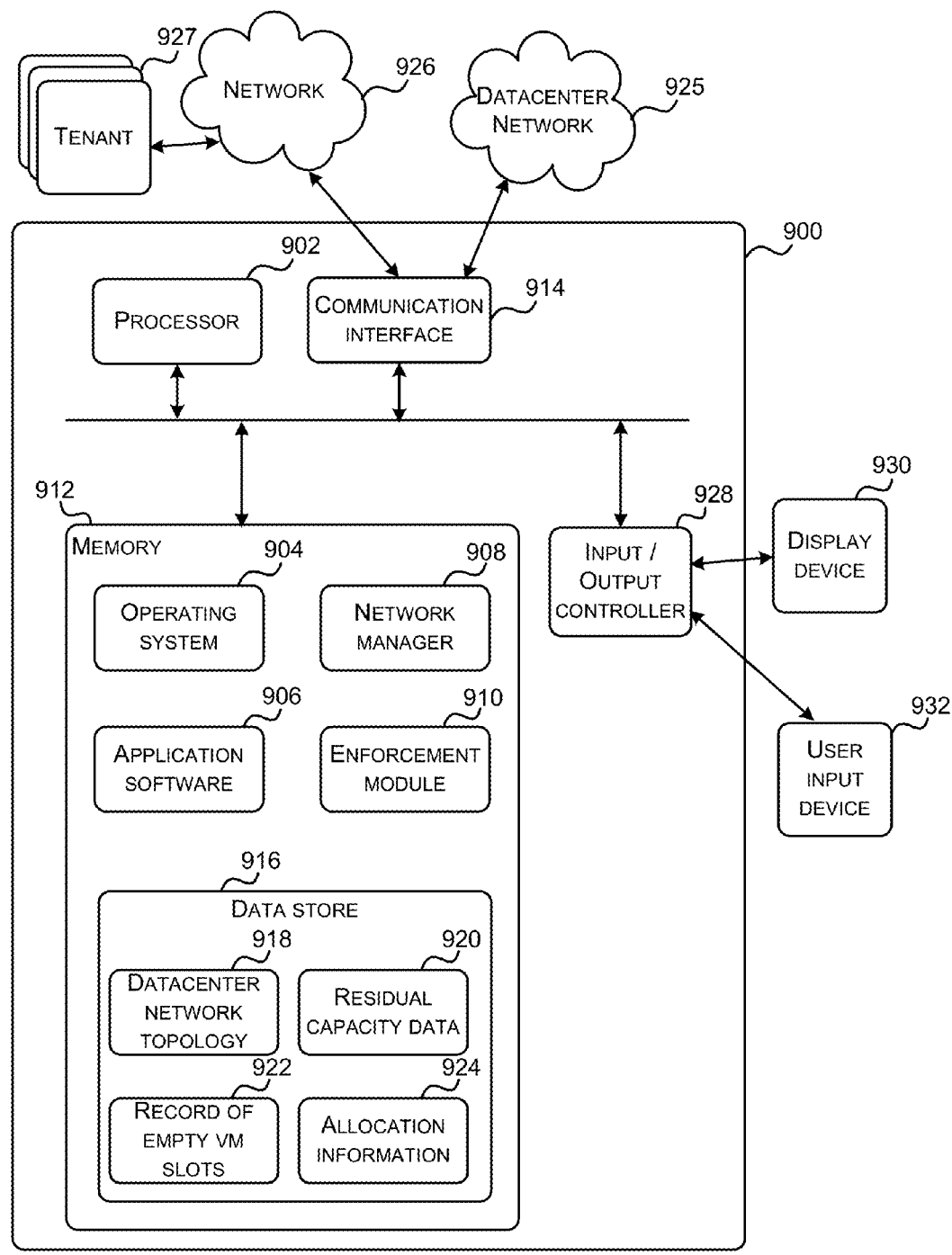
FIG. 9 illustrates an exemplary computing-based device in which embodiments of the methods of managing a datacenter described herein may be implemented.

FIG. 9 illustrates various components of an exemplary computing-based device 900 which may be implemented as any form of a computing and/or electronic device, and in which embodiments of the methods described herein may be implemented.

Computing-based device 900 comprises one or more processors 902 which may be microprocessors, controllers or any other suitable type of processors for processing computer executable instructions to control the operation of the device in order to manage a datacenter. In particular, to implement the NM functionality or to act as an enforcement module at an endhost. In some examples, for example where a system on a chip architecture is used, the processors 902 may include one or more fixed function blocks (also referred to as accelerators) which implement a part of the methods (e.g. part of the VM allocation method) in hardware (rather than software or firmware), e.g. the computation of M. Platform software comprising an operating system 904 or any other suitable platform software may be provided at the computing-based device to enable application software 906-910, which may include a network manager 908 or enforcement module 910, to be executed on the device.

The computer executable instructions may be provided using any computer-readable media that is accessible by computing based device 900. Computer-readable media may include, for example, computer storage media such as memory 912 and communications media. Computer storage media, such as memory 912, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 912) is shown within the computing-based device 900 it will be appreciated that the storage may be distributed or located remotely and accessed via a network or other communication link (e.g. using communication interface 914).

The memory 912 may also comprise a data store 916 for storing data which is used in executing the application software 906-910. Where the computing-based device 900 acts as a network manager, the data store 916 may be arranged to store the datacenter network topology 918, the residual capacity data 920 and a record of empty (i.e. available) VM slots within the datacenter 922. In some examples, as described above, the data store 916 may also be arranged to store allocation information 924 for use in the event of failure, network reconfiguration or release of resources by a tenant.

The communication interface 914 enables communication between the computing-based device 900 and other entities within the datacenter (e.g. other endhosts) or tenants (e.g. to receive the requests in block 112 or 202). This communication may be over the datacenter network 925 (e.g. communication between entities within the datacenter) or another network 926 (e.g. communication with tenants 927).

The computing-based device 900 may also comprises an input/output controller 928 arranged to output display information to a display device 930 which may be separate from or integral to the computing-based device 900. The display information may provide a graphical user interface to the datacenter provider showing the virtual networks allocated within the datacenter. The input/output controller 928 may also be arranged to receive and process input from one or more devices, such as a user input device 932 (e.g. a mouse or a keyboard). The input/output controller 928 may also output data to devices other than the display device, e.g. a locally connected printing device (not shown in FIG. 9).

The virtual network abstractions described above allow tenants to expose their network requirements. This enables a symbiotic relationship between tenants and providers; tenants get a predictable environment in shared settings while the provider can efficiently match tenant demands to the underlying infrastructure, without muddling their interface. Simulations show that the abstractions are practical, can be efficiently implemented and provide significant benefits. The virtual network abstractions can provide a succinct means of information exchange between tenants and providers.

Another aspect of virtual networks is pricing, e.g. cloud pricing. Providing tenants with virtual networks means that it is possible to charge for network bandwidth. This represents a fairer charging model, with a tenant paying more for a virtual cluster with 500 Mbps than one with 100 Mbps (currently a tenant is charged based only on the number of VMs requested). In an example charging model, apart from paying for VM occupancy (k), tenants also pay a bandwidth charge of:

$$k_b \frac{\$}{bw * \text{unit} - \text{time}}$$

Hence, a tenant using a virtual cluster <N,B> for time T pays $NT(k_v+k_bB)$. Analysis has shown that except at low loads, use of virtual networks as described above and such a charging structure can have the effect that providers stay revenue neutral and tenants pay significantly less than today while still getting guaranteed performance. For instance, with a mean bandwidth demand of 500 Mbps, results show that tenants with virtual clusters pay 68% of today at moderate load and 37% of today at high load (31% and 25% respectively with VOC with O=10). The charging model above can be generalized from linear bandwidth costs to $NT(k_v+k_bf(B))$, where f is a bandwidth charging function. The analysis showed similar results with other bandwidth charging functions ($f(B^2)$, $$f(B^{\frac{3}{2}})).$$

In existing charging models, tenants can implicitly be charged for their internal traffic. However, by offering bounded network resources to tenants, this provides explicit and fairer bandwidth charging. More generally, charging tenants based on the characteristics of their virtual networks eliminates hidden costs and removes a key hindrance to cloud adoption. This, in effect, could pave the way for multi-tenant datacenters where tenants can pick the trade-off between the performance of their applications and their cost.

Although the present examples are described and illustrated herein as being implemented in a system which uses a specific metric—inter-VM network bandwidth, the system described is provided as an example and not a limitation. As those skilled in the art will appreciate, the present examples are suitable for application in a variety of different types of systems and other performance metrics or non-performance metrics like reliability may be used. Examples of other performance metrics include bandwidth to the storage service, latency between VMs and failure resiliency of the paths between VMs.

Furthermore, although the present examples are described and illustrated herein as being implemented in a multi-tenant datacenter, the methods described herein may be implemented in any datacenter which runs multiple competing jobs, where the jobs may be for the same entity or different entities. Datacenters do not need to be multi-tenant but may involve an aspect of sharing (e.g. between jobs for the same entity or between jobs for different entities) and although the datacenter may be a cloud-based datacenter, in other examples the datacenter may not be cloud-based. Examples of datacenters which may use the methods described herein include datacenters providing an internet search engine, a cloud datacenter, a company datacenter, a datacenter for High Performance Computing, etc.

The term 'tenant' is used herein to refer to both existing tenants and prospective tenants of the datacenter, i.e. where a method refers to receiving a request from a tenant of the datacenter, this request may be the first request received from that tenant, such that they do not have any existing allocated resources, or the tenant may have submitted previous requests and may already have allocated resources within the datacenter. The term 'user' may be used interchangeably with 'tenant'.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of resource allocation within a datacenter comprising:
   receiving a request for resources from a user, the request comprising a number of virtual machines and a user-specified performance characteristic;
   mapping the request to physical resources within the datacenter to allocate the requested number of virtual machines on physical machines within the datacenter,
   mapping the request to physical resources within the datacenter to allocate the requested number of virtual machines including:

starting at a first level in a topology tree within the datacenter, determining how many virtual machines can be allocated in each sub-tree in the level;

if a sub-tree in the level can accommodate all the requested virtual machines, allocating the requested number of virtual machines in the sub-tree to the user; and if none of the sub-trees in the level can accommodate all the requested virtual machines, moving to a next level in the topology tree and repeating the determining step; and if the allocation is successful, updating stored data identifying residual capacity on a set of elements within the datacenter as a result of the allocation of virtual machines to the user; and sending a message to the user accepting the request;

the user-specified performance characteristic comprising a bandwidth characteristic on links between virtual machines, and the set of virtual machines that can be allocated in each sub-tree in a level being determined based on a minimizing calculation involving the requested number of virtual machines, the number of empty slots in the sub-tree, and the residual bandwidth for a link, the minimization ensuring that the user-specified performance characteristic is satisfied.

2. A method according to claim 1, wherein the performance characteristic comprises a bandwidth characteristic on links between virtual machines and wherein the stored data identifying residual capacity comprises stored data identifying residual bandwidth on each link in the datacenter.

3. A method according to claim 1, wherein mapping the request to physical resources within the datacenter to allocate the requested number of virtual machines comprises mapping the request to allocate a virtual cluster to the user, the virtual cluster comprising the requested number of virtual machines and a virtual switch connecting all of the virtual machines in a one-level tree topology.

4. A method according to claim 1, wherein the performance characteristic comprises a bandwidth characteristic, B, on links between virtual machines and the set $M_v$ of virtual machines m that can be allocated in each sub-tree, v, in a level is defined by:

$$M_v = \{m \in [0, \min(k_v, N)] \text{ s.t. } \min(m, N-m)*B \leq R_l\}$$

where N is the requested number of virtual machines, $k_v$ is the number of empty slots in the sub-tree and $R_l$ is the residual bandwidth for a link l.

5. A method according to claim 1, wherein if the request received from the user further comprises an oversubscription factor and a group size, the requested number of virtual machines are divided into groups of virtual machines of a size specified by the group size and the mapping step is performed for each group of virtual machines in turn.

6. A method according to claim 1, wherein the performance characteristic comprises a bandwidth characteristic, B, on links between virtual machines and the set $M_{v,i}$ of virtual machines that can be allocated to each sub-tree, v, for a group of virtual machines i in a level is defined by:

$$M_{v,i} = \{g_i \in [0, \min(k_v, S)] \text{ s.t. } \Sigma_{j=1}^{i} CB_{r,j,l}(i) \leq R_l\}$$

where $$CB_{r,j,l}(i) = \min(g_j*B, (S-g_j)*B + \min(S*B/O, E))$$

$$E = \Sigma_{k=1, k \neq j}^{i}(S-g_k)*B + \Sigma_{k=i+1}^{P} S*B$$

and $g_i$ is the number of members of group i in the sub-tree, S is the requested number of virtual machines in a group, O is an oversubscription factor, $k_v$ is the number of empty slots in the sub-tree and $R_l$ is the residual bandwidth for a link l.

7. A method according to claim 1 wherein the minimization calculation further comprises minimizing a first function involving the requested number of virtual machines and the number of empty slots in the sub-tree and minimizing a second function involving a number of virtual machines that can be allocated in a sub-tree and the requested number of virtual machines.

8. A method according to claim 7 wherein the minimization calculation further comprises a product of the second function and the bandwidth characteristic on links between virtual machines.

9. A method according to claim 7 wherein the first function is minimized such that a product of the second function and the bandwidth characteristic on links between virtual machines is less than or equal to the residual bandwidth for a link.

10. A method according to claim 1 wherein the request further comprises an oversubscription factor and a group size and the minimization calculation further comprises minimizing a first function such that a result of a summation of a second function is less than or equal to the residual bandwidth for a link.

11. A system comprising:

a datacenter, the datacenter comprising:

a network manager and a plurality of machines connected by switches, each machine comprising at least one slot for allocation of a virtual machine to a tenant; and wherein the network manager is arranged to receive a request for resources from a user, the request comprising a number of virtual machines and a user-specified performance characteristic;

map the request to physical resources within the datacenter to allocate the requested number of virtual machines on physical machines within the datacenter, being arranged to map the request to physical resources within the datacenter to allocate the requested number of virtual machines including:

starting at a first level in a topology tree within the datacenter, determining how many virtual machines can be allocated in each sub-tree in the level;

if a sub-tree in the level can accommodate all the requested virtual machines, allocating the requested number of virtual machines in the sub-tree to the user; and if none of the sub-trees in the level can accommodate all the requested virtual machines, moving to a next level in the topology tree and repeating the determining step; and if the allocation is successful, update stored data identifying residual capacity on a set of elements within the datacenter as a result of the allocation of virtual machines to the user; and send a message to the user accepting the request;

the user-specified performance characteristic comprising a bandwidth characteristic on links between virtual machines; and the set of virtual machines that can be allocated in each sub-tree in a level being determined based on a minimizing calculation involving the requested number of virtual machines, the number of empty slots in the sub-tree, and the residual bandwidth for a link, the minimization ensuring that the user-specified performance characteristic is satisfied.

12. A system according to claim 11, wherein the network manager comprises a data store arranged to store the residual capacity data, network topology information for the datacenter and a record of available virtual machine slots within the datacenter.

13. A system according to claim 12, wherein the data store is further arranged to store allocation information corresponding to previously allocated tenant requests and wherein the network manager is arranged to use the allocation information to reallocate virtual machines upon failure or network reconfiguration.

14. A system according to claim 11, wherein, in use, the datacenter further comprises a plurality of virtual networks, each virtual network corresponding to an allocated request from a tenant and comprising a plurality of virtual machines interconnected by at least one virtual switch.

15. A system according to claim 14, wherein at least one of the plurality of virtual networks comprises a number of virtual machines specified in the request and a virtual switch connecting to each of the virtual machines in a one-level tree topology.

16. A system according to claim 14, wherein at least one of the plurality of virtual networks comprises a number of virtual machines specified in the request arranged in groups, each group comprising a number of virtual machines as specified in the request and each virtual machine in a group is connected to a virtual group switch and wherein the virtual group switches are all connected to a virtual root switch.

17. A system according to claim 11, further comprising an enforcement module at each virtual machine, wherein the enforcement module is arranged to limit traffic to and from the virtual machine in accordance with the tenant-specified performance characteristic.

18. A system according to claim 17, wherein the performance characteristic comprises a bandwidth characteristic and wherein an enforcement module at a virtual machine is arranged to measure traffic rates from the virtual machine to other virtual machines and to perform per-destination-virtual-machine rate limiting to enforce calculated rate limits.

19. A system according to claim 11, further comprising a tenant device arranged to transmit the request to the datacenter.

20. One or more tangible computer storage media storing computer readable instructions that when executed cause one or more processors perform actions that implement resource allocation within a datacenter, the actions comprising:
receiving a request for resources from a user, the request comprising a number of virtual machines and a user-specified performance characteristic;
mapping the request to physical resources within the datacenter to allocate the requested number of virtual machines on physical machines within the datacenter, mapping the request to physical resources within the datacenter to allocate the requested number of virtual machines including:
starting at a first level in a topology tree within the datacenter, determining how many virtual machines can be allocated in each sub-tree in the level;
if a sub-tree in the level can accommodate all the requested virtual machines, allocating the requested number of virtual machines in the sub-tree to the user; and
if none of the sub-trees in the level can accommodate all the requested virtual machines, moving to a next level in the topology tree and repeating the determining step; and
if the allocation is successful,
updating stored data identifying residual capacity on a set of elements within the datacenter as a result of the allocation of virtual machines to the user; and
sending a message to the user accepting the request;
the user-specified performance characteristic comprising a bandwidth characteristic on links between virtual machines; and
the set of virtual machines that can be allocated in each sub-tree in a level being determined based on a minimizing calculation involving the requested number of virtual machines, the number of empty slots in the sub-tree, and the residual bandwidth for a link, the minimization ensuring that the user-specified performance characteristic is satisfied.

* * * * *